United States Patent
Mohapatra et al.

(10) Patent No.: US 8,867,363 B2
(45) Date of Patent: Oct. 21, 2014

(54) RESILIENT FORWARDING OF PACKETS WITH A PER-CUSTOMER EDGE (PER-CE) LABEL

(75) Inventors: Pradosh Mohapatra, Fremont, CA (US); Neeraj Malhotra, Los Gatos, CA (US); Clarence Filsfils, Brussels (BE)

(73) Assignee: Cisco Technology, Inc., San Jose, CA (US)

(*) Notice: Subject to any disclaimer, the term of this patent is extended or adjusted under 35 U.S.C. 154(b) by 113 days.

(21) Appl. No.: 13/405,455

(22) Filed: Feb. 27, 2012

(65) Prior Publication Data

US 2013/0223228 A1 Aug. 29, 2013

(51) Int. Cl.
*H04L 12/26* (2006.01)

(52) U.S. Cl.
USPC .......................................... 370/237

(58) Field of Classification Search
CPC ....................................... H04L 12/56
See application file for complete search history.

(56) References Cited

U.S. PATENT DOCUMENTS

| | | | |
|---|---|---|---|
| 7,826,369 B2 | 11/2010 | Filsfils et al. | |
| 2011/0122874 A1* | 5/2011 | Pacella et al. | 370/392 |
| 2011/0286456 A1* | 11/2011 | Kompella | 370/390 |

OTHER PUBLICATIONS

Rosen et al., "BGP/MPLS IP Virtual Private Networks (VPNs)," Feb. 2006, RFC 4364, http://datatracker.ietf.org/doc/rfc4364, The Internet Society, Reston, VA, USA (forty-seven pages).

Filsfils et al., "BGP Prefix Independent Convergence (PIC) Technical Report," Nov. 2007, available at http://www.academia.edu/3236540/BGP_prefix_independent_convergence_PIC_technical_report, Cisco Systems, Inc., San Jose, CA, USA (fourteen pages).

\* cited by examiner

*Primary Examiner* — Huy D Vu
*Assistant Examiner* — Teisha D Hall
(74) *Attorney, Agent, or Firm* — The Law Office of Kirk D. Williams (57) ABSTRACT

In one embodiment, a packet switching device is configured to perform a lookup operation, based on a particular per-CE label (per-Customer Edge label) included in a particular packet, in a forwarding data structure for identifying forwarding information for the particular packet. When a corresponding outbound path is unavailable, a per-VRF (per-Virtual Routing and Forwarding) lookup operation in a VRF data structure, identified based on the particular per-CE label, based on a destination address of a packet encapsulated within the received packet. A corresponding packet is forwarded based on the results of the VRF lookup operation. In one embodiment, a set of more than one egress line card is identified based on this lookup operation, and packets of different routes are load balanced among egress line cards in this identified set of egress line cards.

20 Claims, 6 Drawing Sheets

RESILIENT FORWARDING OF PACKETS WITH A PER-CUSTOMER EDGE (PER-CE) LABEL

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques may be employed in a network to communicate packets in a network when the topology of the network changes, such as when a path over which certain packets are forwarded becomes unavailable.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with resilient forwarding of packets with a per-customer edge (per-CE) label. As used herein, per-CE label is a label referring to a particular customer edge device.

One embodiment includes a packet switching device configured to perform a lookup operation, based on a particular per-CE label (per-Customer Edge label) included in a particular packet, in a forwarding data structure for identifying forwarding information for the particular packet; wherein said forwarding information includes an output interface when a particular link corresponding to the particular per-CE label is available; and wherein said forwarding information includes an identification to perform a per-VRF (per-Virtual Routing and Forwarding) lookup operation in a VRF data structure identified based on the particular per-CE label when the particular link is not available. The packet switching device is also configured to: perform the per-VRF lookup operation, based on an Internet Protocol (IP) address of an IP packet encapsulated in the particular packet, to identify particular forwarding information in response to said forwarding information including an identification to perform the per-VRF lookup operation; and to send an outgoing packet, corresponding to the particular packet, from the packet switching device based on said forwarding information or said particular forwarding information.

In one embodiment, the packet switching device includes an egress line card and an ingress line card; wherein the forwarding data structure and the VRF data structure are located on the egress line card; wherein the ingress line card includes: one or more processing elements, memory, and an ingress forwarding data structure stored on the ingress line card; and wherein the ingress line card is configured to: receive the particular packet; perform a lookup operation, based on the particular per-CE label, in the ingress forwarding data structure with a result which directly or indirectly identifies the egress line card; and to send the particular packet to the egress line card in response to the result.

In one embodiment, the ingress forwarding data structure includes forwarding information retrievable based on per-CE labels, but does not include forwarding information retrievable based on the IP address. In one embodiment, the ingress forwarding data structure includes forwarding information retrievable based on per-CE labels, but does not include forwarding information retrievable based on any IP address. In one embodiment, the packet switching device includes a second egress line card; wherein the egress line card is configured to send the particular packet to the second egress line card based on said particular forwarding information; and wherein the outgoing packet is sent from the second egress line card. In one embodiment, the packet switching device is configured to delay in updating the ingress forwarding data structure to reflect the particular link not being available over which to send packets including the outgoing packet. In one embodiment, the outgoing packet does not include the particular per-CE label.

In one embodiment, the ingress line card is configured to select the egress line card from a plurality of egress line cards which are associated with the VRF associated with the VRF data structure identified based on the particular per-CE label. In one embodiment, said selecting the egress line card from the plurality of egress line cards includes load balancing packets associated with the per-CE label across the plurality of egress line cards. In one embodiment, said selecting the egress line card from the plurality of egress line cards includes load balancing flows of packets associated with the per-CE label across the plurality of egress line cards. In one embodiment, said selecting the egress line card from the plurality of egress line cards includes a pseudo-random-based selection of the egress line card from the plurality of egress line cards.

In one embodiment, the outgoing packet does not include the particular per-CE label. In one embodiment, the outgoing packet does includes the particular per-CE label.

2. Description

Disclosed are, inter alia, methods, apparatus, computer-storage media, mechanisms, and means associated with resilient forwarding of packets with a per-customer edge (per-CE) label; and as used herein, per-CE label is a label referring to a particular customer edge device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1A:
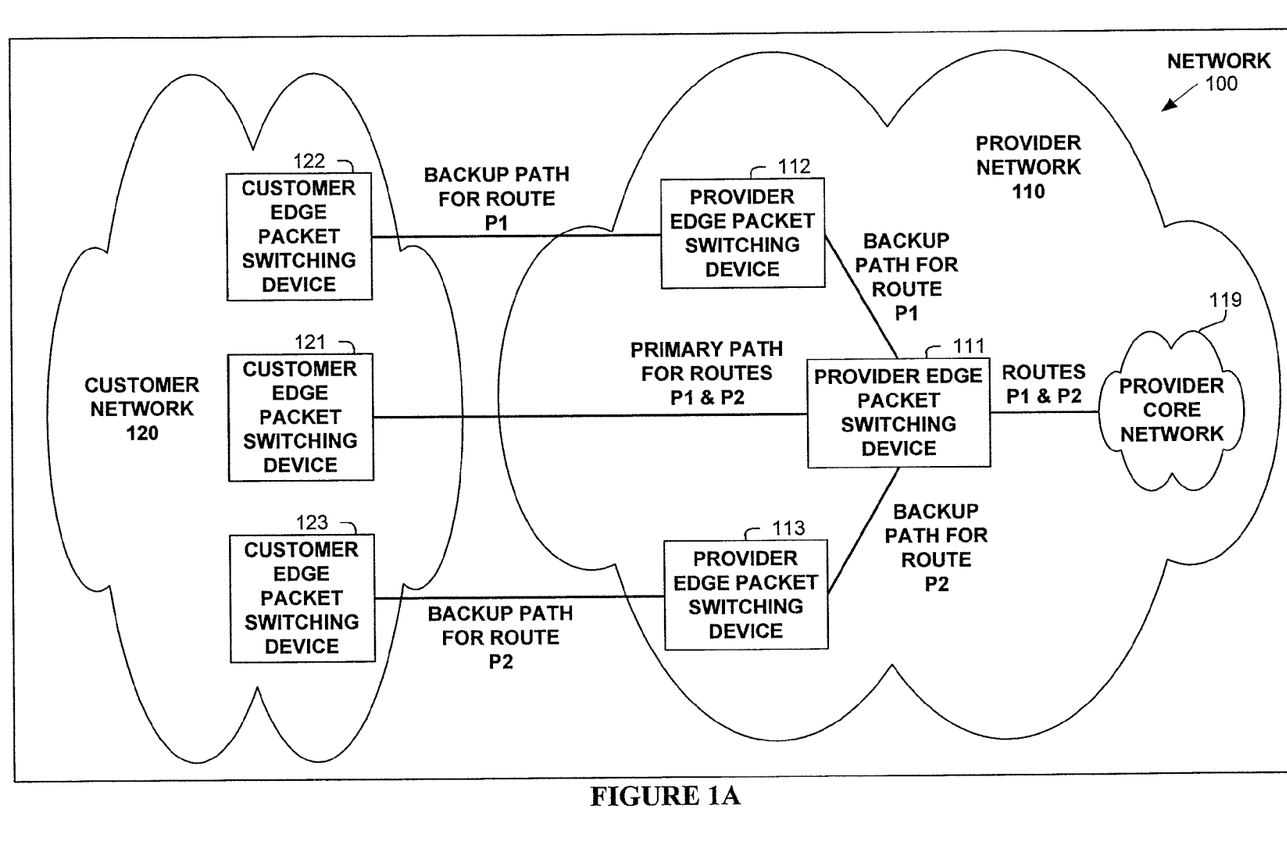
FIGS. 1A-C illustrate a network operating according to one embodiment.
Figure 1B:
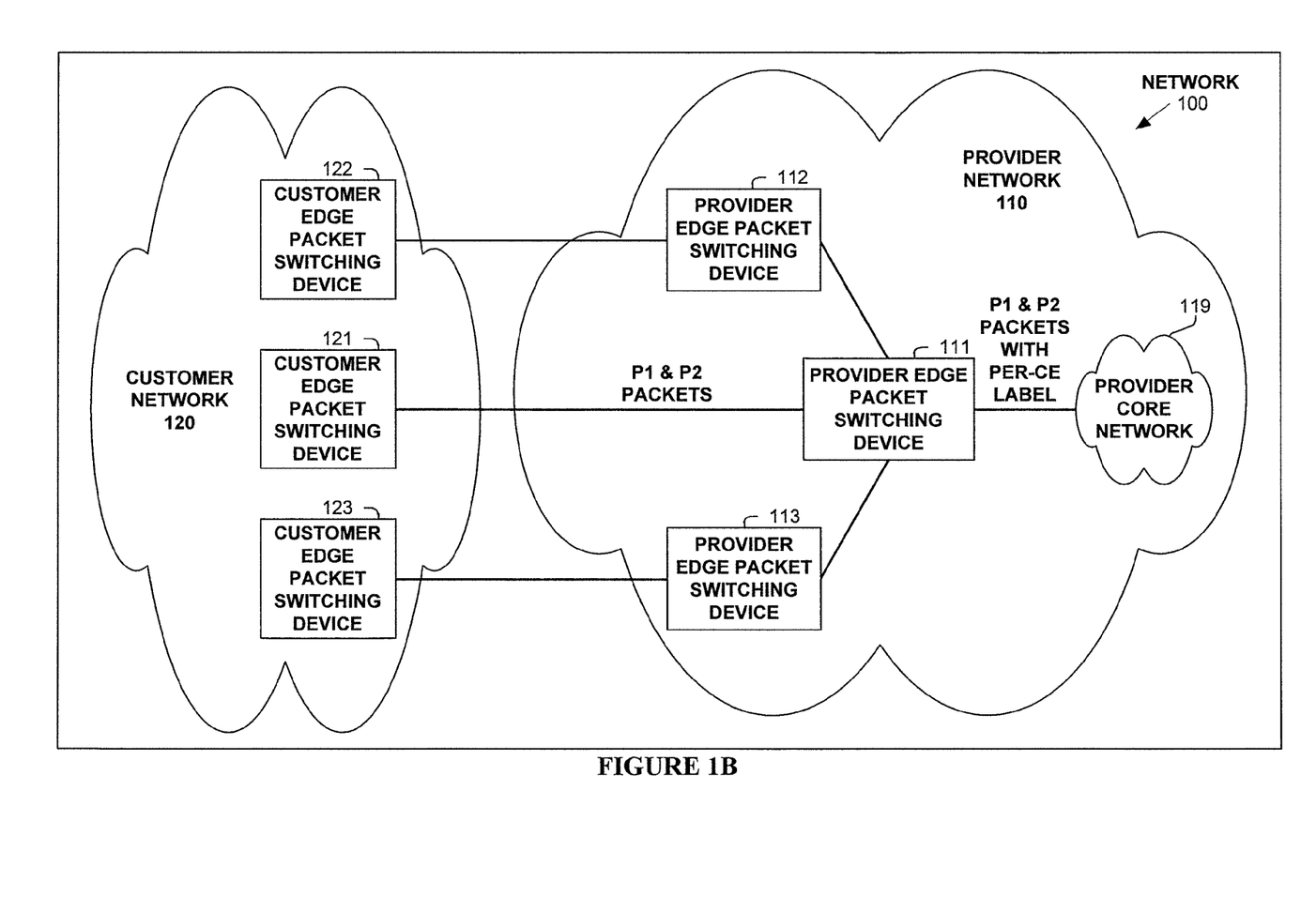
Figure 1C:
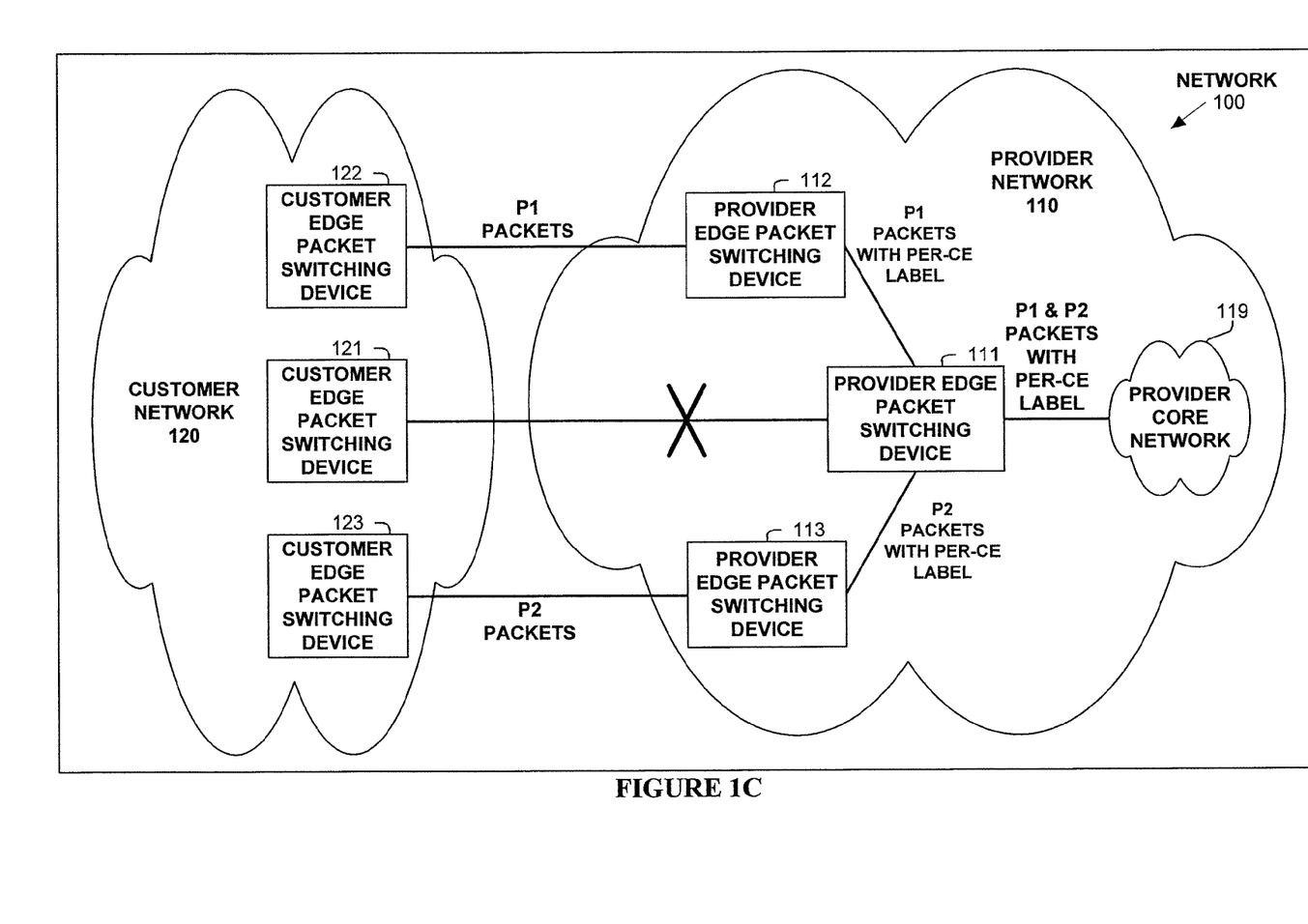

FIGS. 1A-C illustrates the operation of one embodiment. Shown in each of FIGS. 1A-C is network 100, which includes provider network 110 and customer network 120. Customer network 120 includes customer edge packet switching devices 121, 122 and 123 (and typically other packet switching devices that are not shown). Provider edge network 110 includes provider edge packet switching devices 111, 112 and 113, and provider core network 119 (and typically other packet switching devices that are not shown). The term "edge" in referring to a device indicates that the device communicates with a different network (e.g., under the control of another entity). For example, customer edge devices 121, 122 and 123 are the shown customer edge devices between the customer network 120 and the provider network 110. Provider edge devices 111, 112, and 113 are the shown provider edge devices between provider network 110 and customer network 120.

An example of forwarding of packets corresponding to two routes, P1 and P2, from the perspective of provider edge device 111 will be used to illustrate the operation of one embodiment.

FIG. 1A illustrates that the primary path for each of routes P1 and P2 from provider network 110 to customer network 120 is via provider edge device 111, and in particular, from provider edge device 111 to directly connected customer edge device 121. The backup path from provider edge device 111 for route P1 is via provider edge device 112 to customer edge device 122. The backup path from provider edge device 111 for route P2 is via provider edge device 113 to customer edge device 123.

FIG. 1B illustrates the operation of network 100 using per-CE labels corresponding to customer edge device 121, when the primary path from provider edge device 111 is available for each of routes P1 and P2. As shown, provider edge device 111 receives packets with the per-CE label corresponding to customer edge device 121, with a packet encapsulated in one of these received packets having a destination address of route P1 or P2. Provider edge device 111 extracts the encapsulated IP packet from a received packet with the per-CE label corresponding to customer edge device 121, and forwards to customer edge device 121 the IP packet corresponding to route P1 or P2.

FIG. 1C illustrates the operation of network 100 using per-CE labels corresponding to customer edge device 121, when the primary path to customer network 120 from provider edge device 110 is not available for each of routes P1 and P2. The per-CE label does not differentiate between routes P1 and P2. If provider edge device 111 simply had a single backup path programmed into it for forwarding packets received with the per-CE label corresponding to customer edge device 121, provider edge device 111 would forward all of these packets to provider edge device 112 or all of these packets to provider edge device 113. This forwarding of all of these packets over a same backup path is different than the desired operation illustrated in FIG. 1A.

Therefore, in one embodiment, provider edge device 111 is configured to forward packets, received with a same per-CE label, over diverse backup paths such as to distribute the packet load across resources within provider edge device 111, provider network 110, and/or network 100. As shown in FIG. 1C, provider edge device 111 is configured to forward received packets with a per-CE label corresponding to customer edge device 121 to provider edge device 112 for packets corresponding to route P1, and to provider edge device 113 for packets corresponding to route P2. Provider edge devices 112 and 113 are configured to forward corresponding packets to customer network 120.

In one embodiment when a primary route for a packet received with a per-CE label is unavailable, a provider edge device is configured to identify a Virtual Routing and Forwarding context (VRF) based on the per-CE label, and then to perform a lookup operation in this VRF based on the destination route (e.g., IP address) of the encapsulated packet (e.g., an IP packet).

Figure 2A:
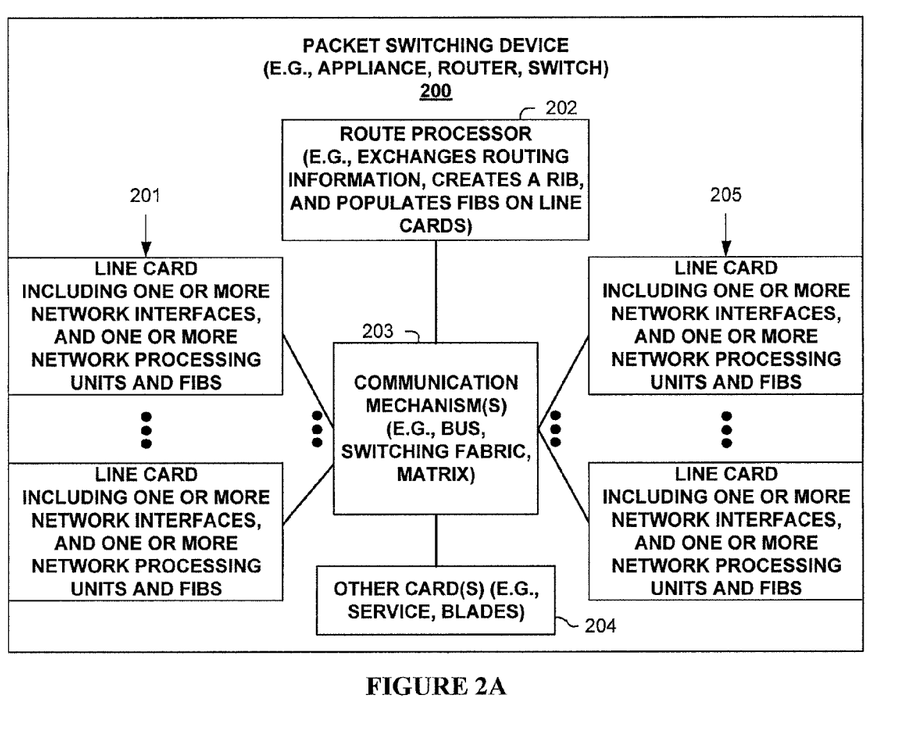
FIG. 2A illustrates a packet switching device according to one embodiment.

One embodiment of packet switching device 200 (e.g., appliance, router, switch bridge) is illustrated in FIG. 2A. As shown, packet switching device 200 includes multiple line cards 201 and 205, each with one or more network interfaces for termination communications links (e.g., possibly part of a multichassis bundle), one or more network processing units and FIBs for use in forwarding packets. Additionally, packet switching device 200 also has a route processor 202, which typically manages the control plane by communicating routing information with other packet switching devices, populates one or more RIBs, and populates one or more FIBs in line cards 201 and 205. Packet switching device 200 also includes other cards 204 (e.g., service cards, blades), and some communication mechanism 203 (e.g., bus, switching fabric, matrix) for allowing its different entities 201, 202, 204 and 205 to communicate. Note, as used herein, a network processing unit refers to a network processor and memory for use in processing (e.g., including forwarding) of packets. A line card can have a single network processing unit, or may have multiple network processing units.

The use of per-CE labels allows a FIB to contain a smaller number of entries than a full Internet route FIB. A per-CE database may include only an entry for each of the number of customer edge devices (or a multiple thereof, such as one for each virtual network supported.) In contrast, full Internet route FIB contains an entry for being able to forward each IP address. Therefore, core-facing line cards of a provider edge device of a pre-CE label switching core network can include fewer resources (e.g., smaller memory) than if it had to be able to perform a lookup operation on every IP address.

Figure 2B:
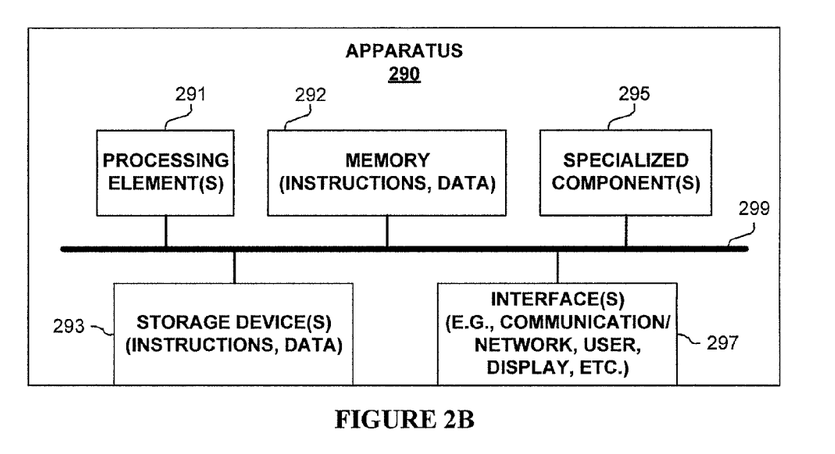
FIG. 2B illustrates an apparatus according to one embodiment.

FIG. 2B is a block diagram of an apparatus 290 used in one embodiment associated with resilient forwarding of packets with a per-customer edge (per-CE) label. In one embodiment, apparatus 290 performs one or more processes corresponding to one of the flow diagrams illustrated or otherwise described herein, and/or illustrated in another diagram or otherwise described herein.

In one embodiment, apparatus 290 includes one or more processing element(s) 291, memory 292, storage device(s) 293, specialized component(s) 295 (e.g. optimized hardware such as for performing operations, etc.), and interface(s) 297 for communicating information (e.g., sending and receiving packets over links of a multichassis bundle, user-interfaces, displaying information, etc.), which are typically communicatively coupled via one or more communications mechanisms 299, with the communications paths typically tailored to meet the needs of a particular application. In one embodiment apparatus 290 corresponds to, or is part of, packet switching device 101-109 and/or 120 of FIG. 1.

Various embodiments of apparatus 290 may include more or fewer elements. The operation of apparatus 290 is typically controlled by processing element(s) 291 using memory 292 and storage device(s) 293 to perform one or more tasks or processes. Memory 292 is one type of computer-readable/computer-storage medium, and typically comprises random access memory (RAM), read only memory (ROM), flash memory, integrated circuits, and/or other memory components. Memory 292 typically stores computer-executable instructions to be executed by processing element(s) 291 and/or data which is manipulated by processing element(s) 291 for implementing functionality in accordance with an embodiment. Storage device(s) 293 are another type of computer-readable medium, and typically comprise solid state storage media, disk drives, diskettes, networked services, tape drives, and other storage devices. Storage device(s) 293 typically store computer-executable instructions to be executed by processing element(s) 291 and/or data which is manipulated by processing element(s) 291 for implementing functionality in accordance with an embodiment.

Figure 3:
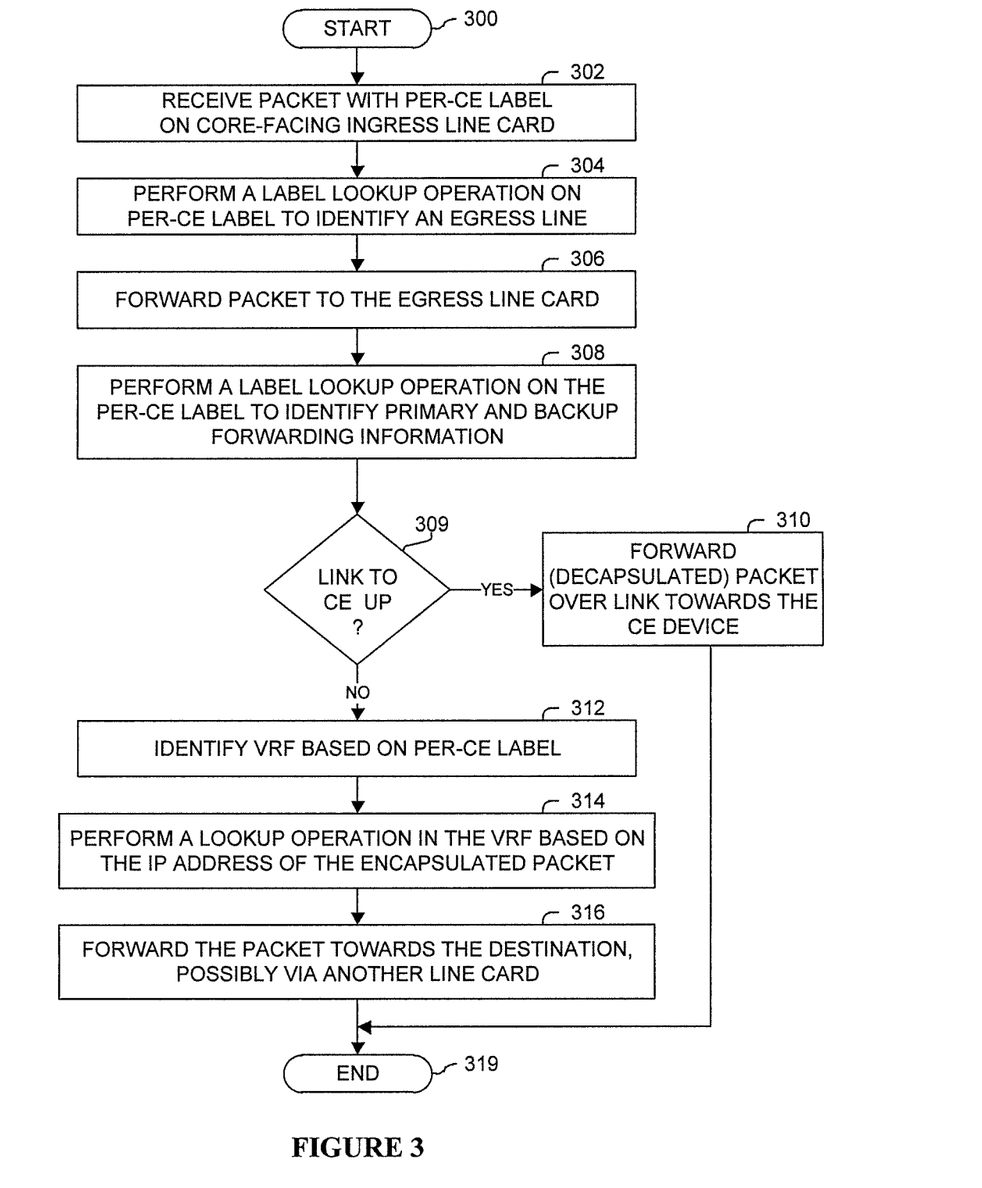
FIG. 3 illustrates a process according to one embodiment.

FIG. 3 illustrates a process performed by a packet switching device (e.g., a provide edge device) in one embodiment. Processing begins with process block 300. In process block 302, a packet with a per-CE label is received on a core-facing ingress line card. In process block 304, a lookup operation is performed in a database on the per-CE label of the packet to identify an egress line card, to which the received packet is forwarded to in process block 306. Therein, a lookup operation is performed on the per-CE label to identify primary and backup forwarding information for the received packet.

As determined in process block 309, if the primary forwarding information identified a link to a customer edge device that is available, then in process block 310, a corresponding packet (e.g., an extracted IP packet) is forwarded over this identified link. Processing of the flow diagram of FIG. 3 is complete as indicated by process block 319.

Otherwise, it was determined that the link corresponding to the primary forwarding information was not available. In response to the backup forwarding information identifying to perform a lookup operation on a VRF identified by the per-CE label, processing continues with process block 312. In process block 312, the VRF corresponding to the per-CE label of the received packet is identified. In process block 314, a lookup operation is performed in the VRF (e.g., in a database associated with the VRF) based on the IP address of the IP packet encapsulated in the packet received by the packet switching device. In process block 316, a corresponding packet (e.g., the received packet with the per-CE label, or an extracted IP packet) is forwarded towards the destination. Processing of the flow diagram of FIG. 3 is complete as indicated by process block 319.

Figure 4:
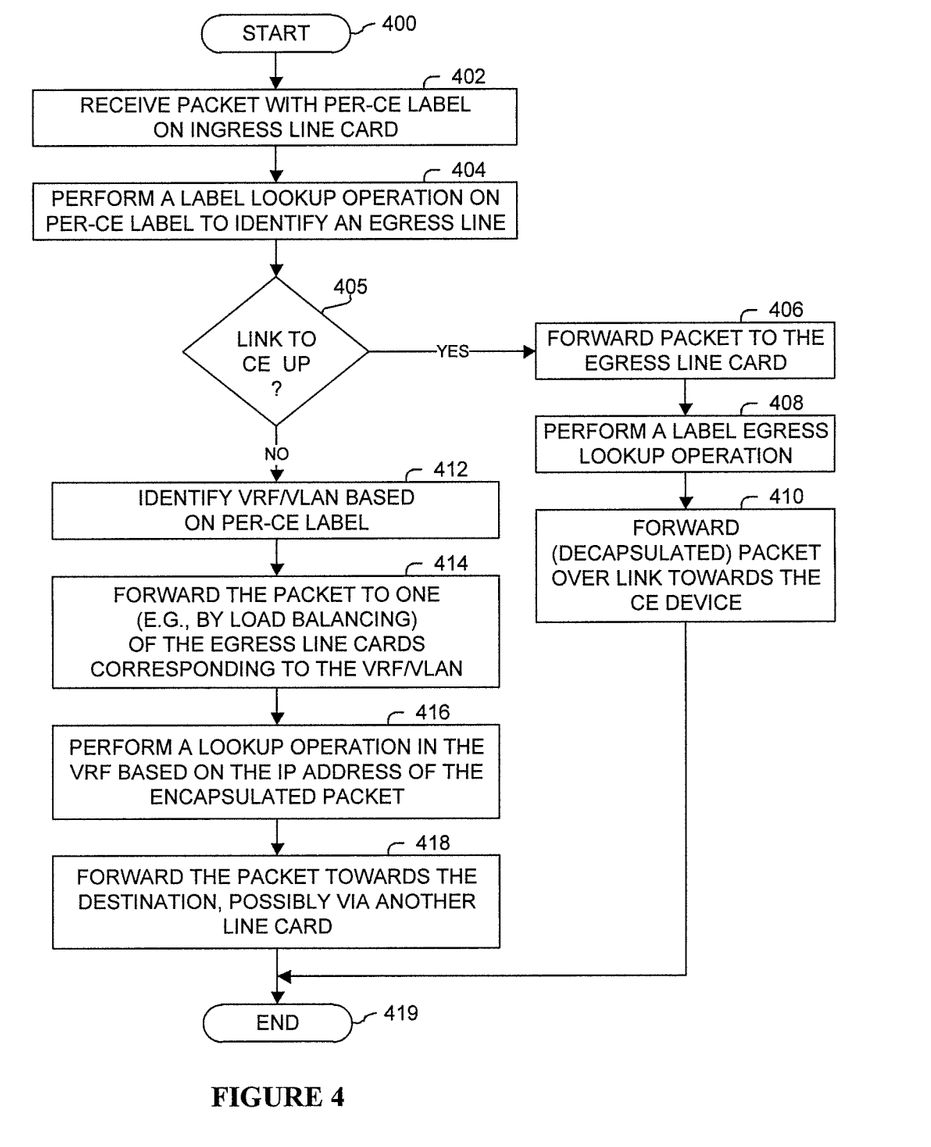
FIG. 4 illustrates a process according to one embodiment.

FIG. 4 illustrates a process performed by a packet switching device (e.g., a provide edge device) in one embodiment. Processing begins with process block 400. In process block 402, a packet with a per-CE label is received on a core-facing ingress line card. In process block 404, a lookup operation is performed in a database on the per-CE label of the packet to identify an egress line card.

As determined in process block 405, if the primary forwarding information identified a link to a customer edge device that is available, then in process block 406, the packet is forwarded to the identified egress line card. In process block 408, a lookup operation is performed in the egress line card to identify forwarding information. In process block 410, a corresponding packet (e.g., typically an IP packet extracted from the received packet) is forwarded towards the customer edge device corresponding to the per-CE label of the received packet. Processing of the flow diagram of FIG. 4 is complete as indicated by process block 419.

Otherwise as determined in process block 405, the link to the customer edge device is not available. Processing continues with process block 412, wherein the VRF corresponding to the per-CE label of the received packet is identified (e.g., by a lookup operation) and one, or a set of one or more egress line cards used in forwarding packets of the VRF. In one embodiment, a single egress line card is identified to which to forward the received packet. In one embodiment, a set of more than one egress line cards is identified, with the received packet to be forwarded to one of the egress line cards selected from this set. In process block 414, the received packet is forwarded to an egress line card that is associated with the VRF. In one embodiment, a load balancing hashing function is applied to select one of multiple available egress line cards to which to forward the packet. In process block 416, a lookup operation is performed in the VRF (e.g., in a database associated with the VRF) based on the IP address of the IP packet encapsulated in the packet received by the packet switching device, which identifies forwarding information. In process block 418, a corresponding packet (e.g., the received packet with the per-CE label, an IP packet extracted from the received packet) is forwarded according to the identified forwarding information, which could identify, inter alia, to forward the corresponding packet out of the packet switching device from one of its interfaces, or to forward the corresponding packet to another egress line card.

Processing of the flow diagram of FIG. 4 is complete as indicated by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A packet switching device, comprising:
a plurality of interfaces configured to send and receive packets;
memory; and
one or more processing elements;
wherein the packet switching device is configured to:
perform a lookup operation, based on a particular per-CE label (per-Customer Edge label) included in a particular packet, in a forwarding data structure to identify forwarding information for the particular packet; wherein said forwarding information includes an output interface when a particular link corresponding to the particular per-CE label is available; and wherein said forwarding information includes an identification to perform a per-VRF (per-Virtual Routing and Forwarding) lookup operation in a VRF data structure identified based on the particular per-CE label when the particular link is not available;
perform the per-VRF lookup operation, based on an Internet Protocol (IP) address of an IP packet encapsulated in the particular packet, to identify particular forwarding information in response to said forwarding information including an identification to perform the per-VRF lookup operation; and
send an outgoing packet, corresponding to the particular packet, from the packet switching device based on said forwarding information or said particular forwarding information.

2. The packet switching device of claim 1, wherein the packet switching device includes an egress line card and an ingress line card;
wherein the forwarding data structure and the VRF data structure are located on the egress line card;
wherein the ingress line card includes: one or more processing elements, memory, and an ingress forwarding data structure stored on the ingress line card; and
wherein the ingress line card is configured to: receive the particular packet; perform a lookup operation, based on the particular per-CE label, in the ingress forwarding data structure with a result which directly or indirectly identifies the egress line card; and to send the particular packet to the egress line card in response to the result.

3. The packet switching device of claim 2, wherein the ingress forwarding data structure includes forwarding information retrievable based on per-CE labels, but does not include forwarding information retrievable based on the IP address.

4. The packet switching device of claim 2, wherein the ingress forwarding data structure includes forwarding information retrievable based on per-CE labels, but does not include forwarding information retrievable based on any IP address.

5. The packet switching device of claim 2, wherein the packet switching device includes a second egress line card; wherein the egress line card is configured to send the particular packet to the second egress line card based on said particular forwarding information; and wherein the outgoing packet is sent from the second egress line card.

6. The packet switching device of claim 5, wherein the packet switching device is configured to delay in updating the ingress forwarding data structure to reflect the particular link not being available over which to send packets including the outgoing packet.

7. The packet switching device of claim 2, wherein the outgoing packet does not include the particular per-CE label.

8. The packet switching device of claim 2, wherein the ingress line card is configured to select the egress line card from a plurality of egress line cards which are associated with the VRF associated with the VRF data structure identified based on the particular per-CE label.

9. The packet switching device of claim 8, wherein said selecting the egress line card from the plurality of egress line cards includes load balancing packets associated with the per-CE label across the plurality of egress line cards.

10. The packet switching device of claim 8, wherein said selecting the egress line card from the plurality of egress line cards includes load balancing flows of packets associated with the per-CE label across the plurality of egress line cards.

11. The packet switching device of claim 8, wherein said selecting the egress line card from the plurality of egress line cards includes a pseudo-random-based selection of the egress line card from the plurality of egress line cards.

12. The packet switching device of claim 1, wherein the outgoing packet does not include the particular per-CE label.

13. The packet switching device of claim 1, wherein the outgoing packet includes the particular per-CE label.

14. A method, comprising:
performing a lookup operation, by a packet switching device based on a particular per-CE label (per-Customer Edge label) included in a received particular packet, in a forwarding data structure to identify forwarding information for the particular packet; wherein said forwarding information includes an output interface when a particular link corresponding to the particular per-CE label is available; and wherein said forwarding information includes an identification to perform a per-VRF (per-Virtual Routing and Forwarding) lookup operation in a VRF data structure identified based on the particular per-CE label when the particular link is not available;
performing the per-VRF lookup operation, by the packet switching device based on an Internet Protocol (IP) address of an IP packet encapsulated in the particular packet, to identify particular forwarding information in response to said forwarding information including an identification to perform the per-VRF lookup operation; and sending an outgoing packet, corresponding to the particular packet, from the packet switching device based on said forwarding information or said particular forwarding information.

15. The method of claim 14, wherein the packet switching device includes an egress line card and an ingress line card; and wherein the forwarding data structure and the VRF data structure are located on the egress line card; and wherein the method includes: performing a lookup operation on the ingress line card, based on the particular per-CE label, in an ingress forwarding data structure with a result which directly or indirectly identifies the egress line card; and sending the particular packet to the egress line card in response to the result.

16. A packet switching device, including:

an ingress line card; and a plurality of egress line cards;

wherein the ingress line card is configured to: perform a lookup operation, based on a particular per-CE label (per-Customer Edge label) included in a particular packet, in an ingress forwarding data structure to identify a particular egress line card of the plurality of egress line cards; and to forward the particular packet to the particular egress line card;

wherein the particular egress line card is configured to perform a lookup operation, based on the particular per-CE label, in a forwarding data structure to identify forwarding information for the particular packet; wherein said forwarding information includes an output interface when a particular link corresponding to the particular per-CE label is available; and wherein said forwarding information includes an identification to perform a per-VRF (per-Virtual Routing and Forwarding) lookup operation in a VRF data structure identified based on the particular per-CE label when the particular link is not available; wherein the particular egress line card is configured to perform the per-VRF lookup operation, based on an Internet Protocol (IP) address of an IP packet encapsulated in the particular packet, to identify particular forwarding information in response to said forwarding information including an identification to perform the per-VRF lookup operation; and wherein the packet switching device is configured to send an outgoing packet, corresponding to the particular packet, from the packet switching device based on said forwarding information or said particular forwarding information.

17. The packet switching device of claim 16, wherein the outgoing packet is sent from the particular egress line card.

18. The packet switching device of claim 16, wherein the outgoing packet is sent from one of the plurality of egress line cards which is not the particular egress line card and was identified from the per-VRF lookup operation.

19. The packet switching device of claim 16, wherein the ingress forwarding data structure includes forwarding information retrievable based on per-CE labels, but does not include forwarding information retrievable based on any IP address.

20. The packet switching device of claim 16, wherein a particular plurality of egress line cards of the plurality of line cards each have an active link for sending packets, with the active link being associated with the VRF associated with the VRF data structure identified based on the particular per-CE label; and wherein the ingress line card is configured to select the egress line card from the particular plurality of egress line cards so as to load balance packets associated with the per-CE label across the plurality of egress line cards.

* * * * *